Patented Nov. 21, 1933

1,935,720

UNITED STATES PATENT OFFICE 1,935,720

HALOGENATED 4.5.8.9-DIBENZPYRENE-3.10-QUINONES AND PROCESS OF PREPARING THEM

Georg Kraenlein and Heinrich Vollmann, Frankfort-on-the-Main-Hochst, and Hans Becker, Hofheim in Taunus, Germany, assignors to General Aniline Works, Inc., New York, N. Y., a corporation of Delaware No Drawing. Application November 25, 1929, Serial No. 409,753, and in Germany December 6, 1928

11 Claims. (Cl. 260—61)

The present invention relates to halogenated 4.5.8.9-dibenzpyrene-3.10-quinones and a process of preparing them.

We have found that vat dyestuffs of the 4.5.8.9-dibenzpyrene-3.10-quinone series containing different halogen atoms possess especially good fastness properties, particularly to washing, and, moreover, partly yield the valuable scarlet tint of the unhalogenated dyestuff whereas, as is well known, iso-(4.5.8.9-) dibenzpyrene-3.10-quinone yields on introduction either of chlorine alone or bromine alone dyestuffs whose tints considerably differ from that of the dyestuff free from halogen.

These 4.5.8.9-dibenzpyrene-3.10-quinones containing different halogen atoms may be obtained by after-chlorination of brominated dibenzpyrenequinones, as well as by after-bromination of chlorinated dibenzpyrenequinones. The position of the halogen atoms, first of all that of the bromine atoms, influences the tint.

As halogenated agents there may be used both halogen itself or an agent splitting off halogen. The reaction is preferably carried out in the presence of a solvent, such as chloro-sulfonic acid, concentrated sulfuric acid, oleum or the like. It may also be advantageous to gently heat the solution or to add a catalyst, such as, for instance, iodine, iron or the like. The halogenation may likewise be effected in a melt of alkali and aluminium chloride.

The following examples serve to illustrate the invention, but they are not intended to limit it thereto; the parts being by weight:

(1) To 25 parts of dichloro-4.5.8.9-dibenzpyrene-3.10-quinone, (obtainable by treating 1.4-di-para-chloro-benzoylnaphthalene with sodium-aluminium-chloride at a temperature of about 150° C.-160° C. while introducing oxygen) dissolved in 10 times its weight of chloro-sulfonic acid, 0.5 parts of iodine and 15 parts of bromine are added. After the mass has been stirred for 6 hours at 50° C., it is diluted with sulfuric acid and decomposed by means of ice-water. The dyestuff which separates in the form of red flakes and which has the probable following formula

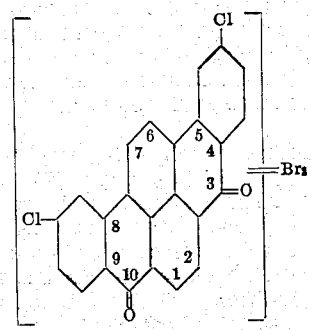

dissolves in concentrated sulfuric acid to a brown-red solution and dyes cotton in a red vat clear scarlet tints of very good fastness properties.

(2) 10 parts of monochloro-4.5.8.9-dibenzpyrene-3.10-quinone (obtainable by condensing 2(p-chlorobenzoyl)-benzanthrone by means of sodium-aluminium-chloride while heating) are dissolved in 100 parts of chloro-sulfonic acid, and 0.5 parts of iodine as well as 7.5 parts of bromine are added. The mass is stirred at 65° C. until the whole quantity of bromine is consumed and then decomposed as indicated in Example 1. The dyestuff thus obtained dyes cotton in a red vat an evidently more bluish red tint than the dyestuff obtained according to Example 1. It has the following probable constitution:

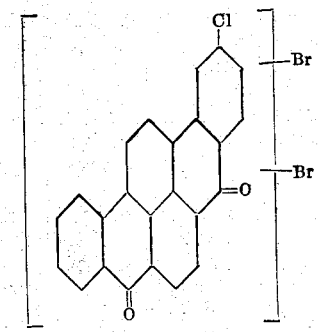

(3) 25 parts of monobromo-4.5.8.9-dibenzpyrene-3.10-quinone, (obtainable by condensing para-bromo-benzoyl-2-benzanthrone by means of sodium-aluminium-chloride in the presence of oxygen), dissolved in 250 parts of chloro-sulfonic acid and 0.2 parts of iodine are treated with chlorine until a test portion on decomposition with water no longer yields bluish-red, but yellowish-red flakes. The dyestuff, after being isolated as in the preceding examples, dyes cotton in a reddish-violet vat clear orange-red tints. It has the following probable constitution:

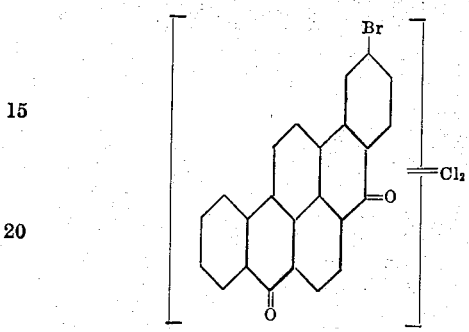

(4) By chlorinating in a manner similar to that indicated in Example 3 the dibromo-4.5.8.9-dibenzpyrene-3.10-quinone, obtainable by treating 1.4-di-para-bromobenzoylnaphthalene with sodium-aluminium-chloride at a temperature of about 120° C. to 125° C. while introducing oxygen, there is likewise obtained an orange-red dyestuff which yields tints of a little more yellowish shade than that described in Example 3.

We claim:

1. The process which comprises treating a 4.5.8.9-dibenzpyrene-3.10-quinone, substituted by one or more halogen atoms, in the presence of an inorganic solvent of the group consisting of chlorosulfonic acid, concentrated sulfuric acid and oleum with a halogenating agent the halogen of which is different from the halogen already present in the starting material.

2. The process which comprises treating, while gently heating, a 4.5.8.9-dibenzpyrene-3.10-quinone, substituted by one or more halogen atoms, in the presence of an inorganic solvent of the group consisting of chlorosulfonic acid, concentrated sulfuric acid and oleum and a halogenation catalyst with halogen which is different from the halogen already present in the starting material.

3. The process which comprises treating a dihalogen-4.5.8.9-dibenzpyrene-3.10-quinone in the presence of an inorganic solvent of the group consisting of chlorosulfonic acid, concentrated sulfuric acid and oleum with a halogenating agent the halogen of which is different from the halogen already present in the starting material.

4. The process which comprises treating, while gently heating, a dihalogen-4.5.8.9-dibenzpyrene-3.10-quinone in the presence of an inorganic solvent of the group consisting of chlorosulfonic acid, concentrated sulfuric acid and oleum and a halogenation catalyst with halogen which is different from the halogen already present in the starting material.

5. The process which comprises treating, while gently heating, a dichloro-4.5.8.9-dibenzpyrene-3.10-quinone in the presence of an inorganic solvent of the group consisting of chlorosulfonic acid, concentrated sulfuric acid and oleum and a halogenation catalyst with bromine.

6. The process which comprises treating, while gently heating to a temperature of about 50° C., a dichloro-4.5.8.9-dibenzpyrene-3.10-quinone in the presence of chloro-sulfonic acid and a small quantity of iodine with bromine.

7. As new products 4.5.8.9-dibenzpyrene-3.10-quinones containing at least two halogen atoms of different kind, said products being vat dyestuffs of very good fastness properties.

8. As new products tetra-halogen-4.5.8.9-dibenzpyrene-3.10-quinone wherein two halogen atoms are chlorine and the other two are bromine, said products being vat dyestuffs of very good fastness properties.

9. As a new product a dichloro-dibromo-4.5.8.9-dibenzpyrene-quinone of the following probable formula:

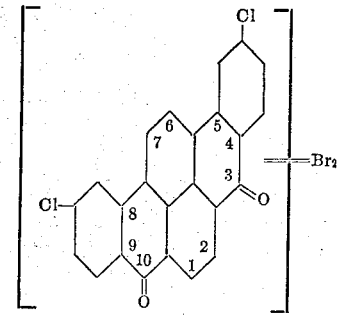

being a red powder which dissolves in concentrated sulfuric acid to a brownish-red solution and dyes cotton in a red vat clear scarlet tints of good fastness properties.

10. As a new product, a monochloro-dibromo-4.5.8.9-dibenzpyrene-3.19-quinone of the following probable formula:

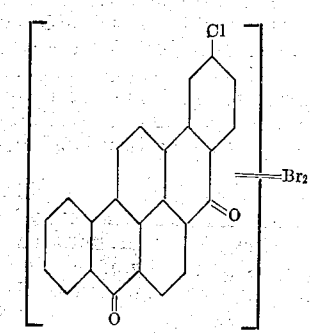

dyeing cotton from a red vat a decidedly more bluish red tint than the product claimed in claim 9.

11. As a new product, a monobromo-dichloro-4.5.8.9-dibenzpyrene-3.10-quinone of the following probable formula:

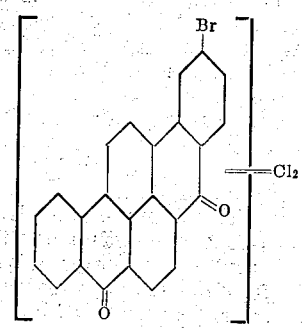

dyeing cotton from a reddish-violet vat clear orange-red tints.

GEORG KRAENZLEIN.
HEINRICH VOLLMANN.
HANS BECKER.